United States Patent Office 3,558,624
Patented Jan. 26, 1971

3,558,624
3-CARBOXYLIC ACID AMIDO-QUINOXALINE-1,4-DI-N-OXIDES
Kurt Ley, Odenthal-Globusch, Ulrich Eholzer, Cologne-Stammheim, Roland Nast, Cologne-Buchheim, Karl Georg Metzger, Wuppertal-Elberfeld, and Dieter Fritsche, Wuppertal-Vohwinkel, Germany, assignors to Farbenfabriken Bayer Aktiengesellschaft, Leverkusen, Germany, a corporation of Germany
No Drawing. Filed Oct. 2, 1968, Ser. No. 764,613
Claims priority, application Germany, Oct. 4, 1967, F 53,366
Int. Cl. C07d 51/78
U.S. Cl. 260—250
22 Claims

ABSTRACT OF THE DISCLOSURE

Compounds, and compositions containing them, are provided for controlling bacterial infections caused by gram-positive and gram-negative bacteria. The compounds are 3-carboxylic acid amido-quinoxaline-1,4-di-N-oxides exemplified by 2-acetoxymethyl-3-carboxylic acid ethyl-amidoquinoxaline-di-N-oxide and its congeners prepared by reacting a 2-halomethyl-3-carboxylic acid amido-quinoxaline-1,4-di-N-oxide, wherein halo is chloro or bromo, with a monocarboxylic acid alkali salt in an organic solvent with or without water present at 40–160° C. The salt is of the type

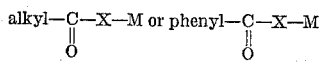

where X is S or O and M is Na, K or $NH_4$. The alkyl group can be halogenated and the phenyl group can be substituted by hydroxy, methoxy or acetoxy. The dosage ranges from 5 mg./kg. to 150 mg./kg. daily orally or parenterally.

The present invention relates to new 3-carboxylic acid amido-quinoxaline-1,4-di-N-oxides which have chemotherapeutic properties, and to a process for their preparation. The 3-carboxylic acid amido-quinoxaline 1,4-di-N-oxides have the formula:

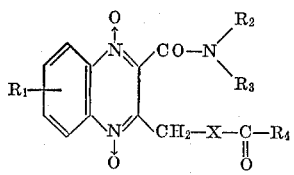

in which $R_1$ is hydrogen, lower alkyl, lower alkoxy or chlorine,
$R_2$ is hydrogen or a straight or branched chain alkyl radical unsubstituted or substituted by hydroxy, lower alkoxy, acyloxy, mono- or di-alkylamino,
$R_3$ is hydrogen or a straight or branched chain alkyl radical unsubstituted or substituted by hydroxy, lower alkoxy, acyloxy or mono- or di-alkylamino or, when $R_2$ is hydrogen, $R_3$ is cyclohexyl, or
$R_2$ and $R_3$ together with the amide nitrogen atom form a 5- or 6-membered ring,
$R_4$ is alkyl, halogen substituted alkyl, phenyl or hydroxy, methoxy or acetoxy substituted phenyl, and
X is oxygen or sulphur.

These new compounds are produced by a process in which a 2 - halomethyl - 3 - carboxylic acid amido-quinoxaline-1,4-di-N-oxide of the formula:

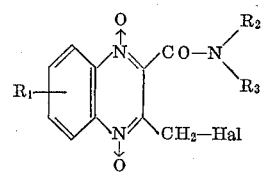

(2)

(in which Hal is chlorine or bromine) is reacted with a salt of a monocarboxylic acid of the formula:

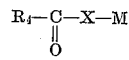

(3)

(in which M is sodium, pottassium or ammonium) in an organic solvent (optionally in the presence of water) in the temperature range of about 40° to about 160° C.

Surprisingly, the new compounds of the invention show an excellent chemotherapeutic effectiveness.

When $R_1$ is alkyl or alkoxy the alkyl generally contains 1 to 4 carbon atoms. When $R_2$ and $R_3$ are alkyl radicals they generally contain 1 to 12, preferably 1 to 6, carbon atoms. The substituents (e.g. alkoxy or acyloxy) of the said alkyl radicals $R_2$ and $R_3$ have, in general, 1 to 4 carbon atoms in the alkyl group, the mono- and di-alkyl-amino groups likewise have, in general, 1 to 4 carbon atoms per alkyl group. In the case where $R_2$ and $R_3$ together with the N-atom form part of a heterocyclic ring, this ring may contain, besides the amide nitrogen, a further nitrogen or an oxygen heteroatom; in the case of the 6-membered ring the further heteroatom is preferably in p-position to the amide nitrogen atom, and the hydrogen atom may be substituted on the additional nitrogen atom by a lower alkyl ($C_1$–$C_4$) radical which, in turn, may be further substituted by hydroxy, methoxy or acetoxy.

When 2-chloromethyl-3-carboxylic acid methylamido-quinoxaline-1,4-di-N-oxide and sodium benzoate are used as starting materials, the reaction course can be represented by the following formula scheme:

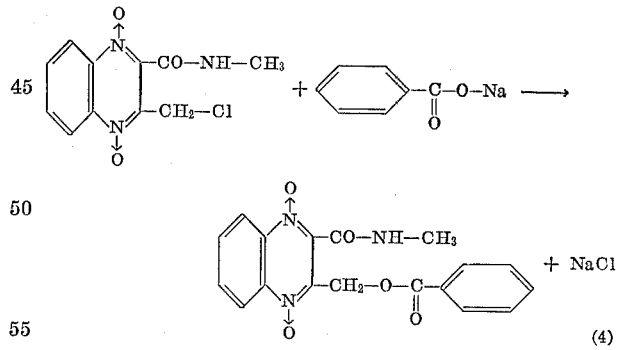

(4)

As examples of the 2-halomethyl-3-carboxylic acid amido-quinoxaline-1,4-di-N-oxides to be used according to the invention as starting compounds, there are mentioned in particular:

2 - chloromethyl - 3 - carboxylic acid methylamido-quinoxaline - di - N - oxide - (1,4), 2-chloromethyl-3-carboxylic acid butylamido - quinoxaline - di - N-oxide- (1,4), 2 - chloromethyl - 3 - carboxylic acid - β-methoxy - ethyl - amido - quinoxaline - di-N-oxide- (1,4), 2 - chloromethyl - 3 - carboxylic acid dimethylamido - quinoxaline - di - N - oxide-(1,4), 2-chloromethyl - 3 - carboxylic acid - β - acetoxy-ethylamido-quinoxaline - di - N - oxide - (1,4), 2-chloromethyl-3 - carboxylic acid cyclohexylamido - quinoxaline-di-N - oxide - (1,4), 2 - bromomethyl - 3 - carboxylic acid pyrrolidylamido - quinoxaline - di - N - oxide-(1,4), 2 - chloromethyl - 3 - carboxylic acid amido-quinoxaline - di - N - oxide - (1,4), 2-chloromethyl-3 - carboxylic acid methylamido - 7 - methyl-quinoxaline - di - N - oxide -(1,4), 2-chloromethyl-3-carboxylic acid methylamido - 7 - methoxy - quinoxaline-di - N - oxide - (1,4), 2 - chloromethyl - 3 - carboxylic acid methylamido - 7 - ethoxy - quinoxaline - di - N-oxide - (1,4), 2 - chloromethyl - 3 - carboxylic acid methyl - amido - 7 - chloro - quinoxaline - di - N-oxide-(1,4), 2 - chloromethyl - 3 - carboxylic acid piperidylamido-quinoxaline-di-N-oxide-(1,4).

As monocarboxylic acid salts used as reactants, there may be mentioned as examples: sodium acetate, potassium acetate, ammonium acetate, sodium benzoate, sodium salicylate, sodium chloroacetate, sodium o-methoxy-benzoate, sodium o-acetoxy methyl benzoate, sodium thioacetate.

One to two moles of one of the said monocarboxylic acid salts in solid form or dissolved in water are used per mole of 2-halomethyl-3-carboxylic acid amido-quinoxaline-1,4-di-N-oxide.

As diluent, there may be used water-miscible organic solvents, lower alcohols, preferably ethanol, acetonitrile, dimethylformamide, dimethyl sulphoxide, dioxan.

A preferred embodiment of the process according to the invention comprises suspending or dissolving one mole of the 2 - halomethyl - 3 - carboxylic acid-amido-quinoxaline - 1,4 - di - N - oxide in one of the organic solvents and adding one to two moles of the monocarboxylic acid salt in the form of its concentrated aqueous solution.

The reaction takes place in the temperature range of about 40 to about 160° C., preferably about 60 to about 100° C.

The 3 - carboxylic acid amido-quinoxaline-1,4-di-N-oxides of the Formula 1 are crystalline colorless or pale-yellow to flesh-colored substances. In general, they separate in crystalline form during cooling of the reaction mixture and can be isolated in customary manner, and if necessary, purified.

As already mentioned, the novel compounds of the invention show chemotherapeutic effectiveness. Their chemotherapeutic activity has been tested in animal experiments (orally and subcutaneously) in the case of acute bacterial infections and in vitro. They show in both cases very good antibacterial activity, the range of activity encompassing both gram-negative and gram-positive baceteria. The compounds can be administered both orally and parenterally.

In general, it has proved advantageous in the case of acute general infections to administer amounts of about 5 mg. to about 150 mg., as a rule about 25 to about 150 mg., per kilogram of body weight per day in order to achieve effective results. Nevertheless, it may in some cases be necessary to deviate from the said amounts, depending on the infection mode or the nature of the bacteria, the body weight of the test animal or the route of application, but also because of the type of animal and its individual behavior towards the medicament or the kind of formulation thereof and the point in time or interval of time at which administration takes place. Thus, it may in some cases be sufficient to manage with less than the aforesaid minimum amount, whereas in other cases the said upper limit has to be exceeded. In the case of application of larger amounts, it may be advisable to distribute these in several individual doses during the day. For human medicine, the same dosage latitude is provided; even lower dosages may be suitable because of the different metabolic conditions.

The chemotherapeutical agents may be used either as such or in combination with pharmaceutically acceptable vehicles. Suitable as administration forms in combination with various inert vehicles are tablets, capsules, powders, sprays, aqueous suspensions, injectable solutions, elixirs, syrups and the like. Such vehicles include solid diluents or fillers, a sterile aqueous medium as well as various non-toxic organic solvents and the like. Tablets and the like suitable for oral administration may, of course, be provided with sweetening additives or the like. The therapeutically effective compound should in the aforesaid case be present in a concentration of about 0.5 to 90 percent by weight of the total mixture, i.e., in amounts which are sufficient to achieve the above-mentioned dosage margin.

In the case of oral application, tablets may of course also contain additives such as sodium citrate, calcium carbonate and dicalcium phosphate, together with various adjuvants such as starch, preferably potato starch, and the like, and binders such as polyvinylpyrrolidone, gelatin and the like. Furthermore, lubricants such as magnesium stearate, sodium lauryl sulphate and talc can also be used for tablet-making. In the case of aqueous suspensions and or elixirs which are intended for oral applications, the active compound can be used with various taste improvers, dyestuffs, emulsifiers and/or together with diluents such as water, ethanol, propylene glycol, glycerol and similar such compounds or combinations.

For the case of parenteral application, solutions of the active compounds in sesame oil or arachis oil or in aqueous propylene glycol or N,N-dimethyl formamide can be used, as well as sterile aqueous solutions in the case of the water-soluble compounds. Such aqueous solutions should if necessary be buffered in customary manner and, furthermore, the liquid diluent should be rendered isotonic beforehand by addition of the requisite amount of salt or glucose. Such aqueous solutions are particularly suitable for intravenous, intramuscular and intraperitoneal injections.

The preparation of such sterile aqueous media takes place in known manner.

The effectiveness of some of the compounds described can be seen from the following summary; the number of the compounds tested correspond to the numbers of the examples added hereinafter. In the animal experiments with the white mouse, the intraperitoneally infected animals were treated subcutaneously or orally, as follows:

(1) Administration in one dose, subcutaneously or orally, of 1000 mg., 500 mg., 200 mg., 100 mg., 50 mg., 25 mg., 12.5 mg., or 6.25 mg./kg. 15 minutes before or 90 minutes after infection.

(2) Administration in two (or three) doses of 6.25 mg., 12.5 mg., 25 mg., 50 mg., or 150 mg./kg. two hours before and 5 hours after infection.

(3) Administration in four doses of 50 mg. or 150 mg./kg. two hours before infection, shortly before infection, 3 hours, 5 hours and (or) 21 hours and 29 hours after infection.

As infection germs there were used *E. coli*, Klebsiella, *Staphylococcus aureus*, *Diplococcus pneumoniae* or *Streptococcus pyogenes*, *Proteus mirabilis* and *Pseudomonas aeruginosa*.

The $ED_{100}$ of the most effective compounds (e.g. 3, 4, 11, 16) against *E. coli* C 165 or *Staphylococcus aureus* 133 lies, in the case of administration in one dose, orally or subcutaneously, between 5 mg./kg. and 100 mg./kg. The $DL_{50}$ lies in the dosage range of about 400 mg./kg. to about 1500 mg./kg. after oral administration in one dose to mice. The substances are thus relatively nontoxic since the relatively less well tolerated ones are distinguished by higher effectiveness and are therefore applied only in low dosage. Also in the case of treatment of rats with 60 mg./kg. orally twice daily over two weeks, the substances were well tolerated. In the case of acute ascending infections of the urinary tract of the rat (pyelonephritis), dosage of 2×15 mg./kg. daily over 7–10 days were applied with success. In vitro, the substances act bacteriostatically and bactericidally. The new compounds are also effective against Mycoplasma infections in the in vitro test, amounts of about 5 to about 50γ per ml. being used.

ANIMAL EXPERIMENTS WITH THE WHITE MOUSE
[100% Surviving Animals 24 hours after Infection]

| Infection germ | Example | | | | | | | |
|---|---|---|---|---|---|---|---|---|
| | 1 | 2 | 3 | 4 | 5 | 6 | 7 | 8 |
| E. coli C 165, dose mg./kg. oral and subcutaneous | 1×25 | 1×6 | 1×10 | 1×10 | 1×25 | 1×25 | 1×12 | 1×10 |
| Staph. aureus 133, dose mg./kg. oral and subcutaneous | 1×100 | 1×100 | 1×75 | 1×100 | 1×50 | 1×100 | 1×100 | 1×75 |

IN VITRO INHIBITION VALUES
[Minimum Inhibition Concentration in μg/ml. Nutrient Medium]

| Bacterium | Example | | | | | | | | | | |
|---|---|---|---|---|---|---|---|---|---|---|---|
| | 2 | 3 | 1 | 5 | 6 | 7 | 8 | 11 | 12 | 13 | 14 | 16 |
| E. coli | 10–100 | 5 | 10 | 10–100 | 10–100 | 10–100 | 100 | 10–100 | 10–100 | 10–100 | >100 | 10–100 |
| Psuedomonas aeruginosa | 100 | 100 | 100 | >100 | >100 | >100 | >100 | >100 | >100 | 100 | >100 | >100 |
| Protein sp | 10 | 10 | 10 | 10 | 100 | 100 | 100 | 100 | 100 | 100 | >100 | 100 |
| Klebsiella sp | 5 | 5 | 10 | 10–100 | 10–100 | 100 | 100 | 10–100 | >100 | 10–100 | >100 | 10–100 |
| Staphyloccus aureus | 10 | 10 | 10 | 10 | 100 | 100 | 100 | 100 | 100 | 100 | >100 | 10 |
| Streptococcus pyogenes | 10 | 100 | 10 | 10 | >100 | 10 | 10 | 01 | 10 | 100 | 100 | 100 |

The invention is illustrated by the following non-limitative examples.

EXAMPLE 1

28.2 g. (0.1 mole) of 2-chloromethyl-3-carboxylic acid ethylamido-quinoxaline-di-N-oxide-(1,4) are suspended in 100 ml. of ethanol, a solution of 16 g. (0.2 mole) of sodium acetate in 25 ml. of water is added and heating to the boil is effected. After about 30 minutes a clear solution is obtained. Heating is continued for a further 30 minutes, followed by cooling. 20 g. (=66% of the theory) of 2-acetoxymethyl-3-carboxylic acid ethylamido-quinoxaline-di-N-oxide-(1,4) separate as yellow crystals which, after washing with cold water and recrystallization from methanol, melt at 153° C.

Analysis.—$C_{14}H_{15}N_3O_5$ (molecular weight 305). Calc. (percent): C, 55.1; H, 4.92; N, 13.7. Found (percent): C, 55.4; H, 5.1; N, 14.1.

In manner analogous with that described in Example 1, the compounds listed below can be obtained:

| Example No. | Formula | | M.P. in ° C. | Appearance |
|---|---|---|---|---|
| 2 | quinoxaline-1,4-di-N-oxide with -CO-NH$_2$ and -CH$_2$-O-CO-CH$_3$ substituents | (5) | 224 | Pale-yellow crystals. |
| 3 | quinoxaline-1,4-di-N-oxide with -CO-NH-CH$_3$ and -CH$_2$-O-CO-CH$_3$ substituents | (6) | 169 | Do. |
| 4 | quinoxaline-1,4-di-N-oxide with -CO-NH-C$_2$H$_5$ and -CH$_2$-O-CO-CH$_3$ substituents | (7) | 153 | Do. |
| 5 | quinoxaline-1,4-di-N-oxide with -CO-NH-C$_3$O$_7$ and -CH$_2$-O-CO-CH$_3$ substituents | (8) | 144 | Do. |
| 6 | quinoxaline-1,4-di-N-oxide with -CO-NH-CH(CH$_3$)$_2$ and -CH$_2$-O-CO-CH$_3$ substituents | (9) | 156 | Do. |

| Example No. | Formula | | M.P. in °C. | Appearance |
|---|---|---|---|---|
| 7 | 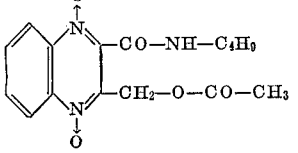 | (10) | 106 | Pale-yellow crystals. |
| 8 | 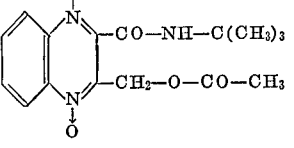 | (11) | 220 | Do. |
| 9 | 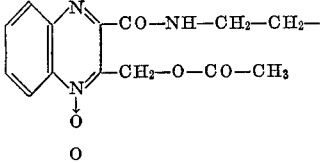 | (12) | 145 | Do. |
| 10 | 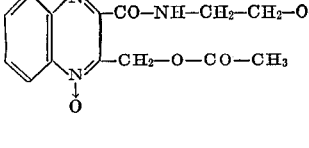 | (13) | 156 | Do. |
| 11 | 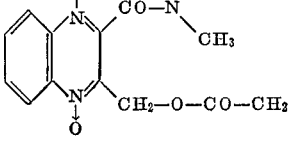 | (14) | 213 | Do. |
| 12 | 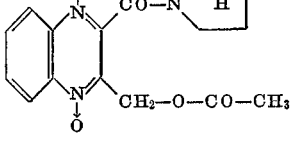 | (15) | 157 | Do. |
| 13 | 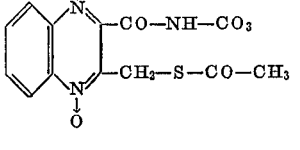 | (16) | [1] 204 | Do. |
| 14 | 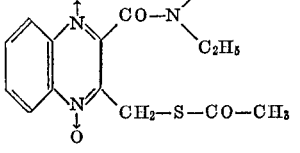 | (17) | 140 | Do. |
| 15 | 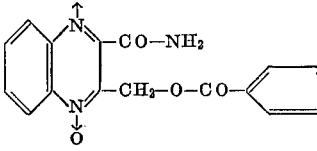 | (18) | 221 | Do. |
[1] Decomposition.

| Example No. | Formula | | M.P. in °C | Appearance |
|---|---|---|---|---|
| 16 | [quinoxaline-1,4-dioxide with -CO-NH-CH₃ and -CH₂-O-CO-C₆H₅ substituents] | (19) | 204 | Pale-yellow crystal. |
| 17 | [quinoxaline-1,4-dioxide with -CO-NH-CH₂-CH₂-O-CH₃ and -CH₂-O-CO-C₆H₅ substituents] | (20) | 132 | Do. |
| 18 | [quinoxaline-1,4-dioxide with -CO-NH-CH₃ and -CH₂-O-CO-C₆H₄-OH substituents] | (21) | 208 | Do. |

The 2-chloromethyl-3-carboxylic acid methylamido-quinoxaline-1,4-di-N-oxide used as starting material for the reaction according to the invention was obtained as follows:

(A) 233 g. (1 mole) 2-methyl-3-carboxylic acid methylamido-quinoxaline-di-N-oxide-(1,4) are suspended in 700 ml. chloroform and heated to the boil. Into the boiling mixture there are introduced, within 3 hours, with stirring, 90 g. (2.5 gram atoms) of chlorine. First the starting material dissolves, then the reacton product separates in crystalline form. Stirring is continued for 30 minutes at boiling temperature; air is then blown into the reaction mixture for 30 minutes in order to remove the HCl which is formed, and this is followed by cooling, and suction filtration. After recrystallization from ethanol/dioxan 181 g. (=68% of the theory) of 2-chloromethyl-3-carboxylic acid methylamido-quinoxaline-1,4-di-N-oxide are obtained as yellow crystals which melt at 195–196° C.

*Analysis.*—$C_{11}H_{10}ClN_3O_3$ (Molecular weight 267.5) Calc. (percent): Cl, 13.3. Found (percent): Cl, 13.0.

(B) The same substance was obtained by chlorination in glacial acetic acid at 85–90° C. For working up, the reaction solution obtained is poured into water. A yellow oil separates, which crystallizes when rubbed with methanol. The substance shows no depression of melting point with that described under A.

In manner analogous with that described in the above example, the other 2-halomethyl-3-carboxylic acid amido-quinoxaline-di-N-oxides-(1,4) used for the reaction according to the invention can also be obtained.

The new 3-carboxylic acid amido-quinoxaline-1,4-di-N-oxides (X=O) may, if desired, also be obtained by oxidation of quinoxaline derivatives of the formula:

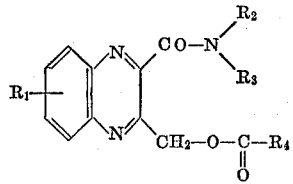

in which $R_1$, $R_2$, $R_3$ and $R_4$ have the meanings stated above with hydrogen peroxide in the presence of glacial acetic acid or acetic anhydride or an organic per-acid (peracetic acid, perbenzoic acid, monoperphthalic acid) or mixture thereof and the like according to know methods (Houben-Weyl, Methoden der organischen Chemie, vol. XI/2, page 190; E. Ochiai, Aromatic Amineoxides, Elsevier Publishing Company, 1967).

The invention also provides a pharmaceutical composition comprising one or more of the new active compounds in admixture with a solid or liquid diluent or carrier.

The invention further provides a medicament in dosage unit form comprising at least one of the new active compounds either alone or in admixture with a solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. A 3-carboxylic acid amido-quinoxaline-1,4-di-N-oxide of the formula:

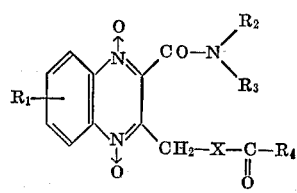

in which
- $R_1$ is hydrogen, lower alkyl having 1 to 4 carbon atoms, lower alkoxy having 1 to 4 carbon atoms in the alkyl part or chlorine,
- $R_2$ is hydrogen or straight or branched chain alkyl having 1 to 12 carbon atoms unsubstituted or substituted by hydroxy, lower alkoxy having 1 to 4 carbon atoms in the alkyl part, acyloxy having 1 to 4 carbon atoms in the alkyl part, mono- or di-alkylamino having 1 to 4 carbon atoms in the alkyl part,
- $R_3$ is hydrogen or straight or branched chain alkyl having 1 to 12 carbon atoms unsubstituted or substituted by hydroxy, lower alkoxy having 1 to 4 carbon atoms in the alkyl part, acyloxy having 1 to 4 carbon atoms in the alkyl part or mono- or di-alkylamino having 1 to 4 carbon atoms in the alkyl part or, when $R_2$ is hydrogen, $R_3$ is cyclohexyl, or
- $R_2$ and $R_3$ together with the amide nitrogen atom form part of a 5- or 6-membered heterocyclic ring or such ring having an additional nitrogen or oxygen heteroatom or such 6-membered ring wherein the further heteroatom is para to the amide nitrogen atom, or the hydrogen atom on the additional nitrogen heteroatom substituted by lower alkyl having 1 to 4 carbon atoms, or such lower alkyl substituent further substituted by hydroxy, methoxy or acetoxy,
- $R_4$ is methyl or chloromethyl, or phenyl or phenyl substituted by hydroxy, methoxy or acetoxy, and
- X is oxygen or sulphur.

2. A compound according to claim 1 in which $R_2$ and $R_3$ are substituted or unsubstituted alkyl or 1–6 carbon atoms in the alkyl chain.

3. The compound:

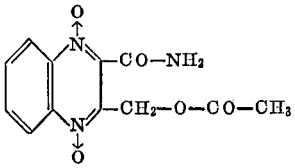

4. The compound:

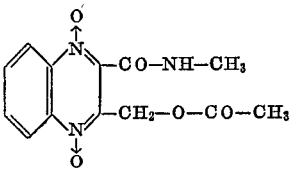

5. The compound:

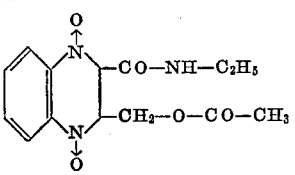

6. The compound:

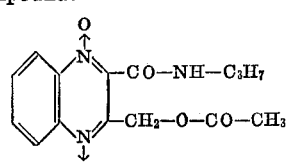

7. The compound:

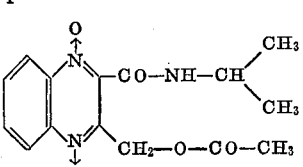

8. The compound:

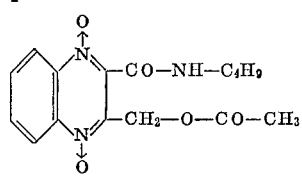

9. The compound:

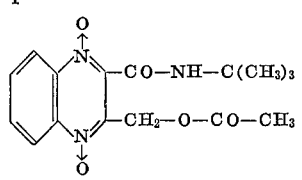

10. The compound:

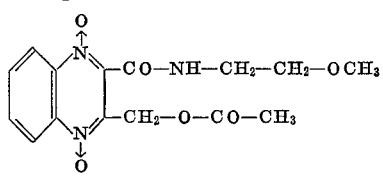

11. The compound:

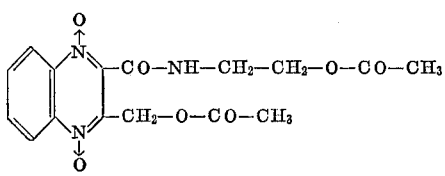

12. The compound:

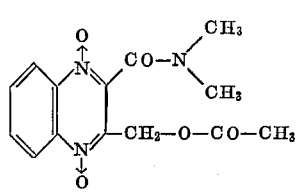

13. The compound:

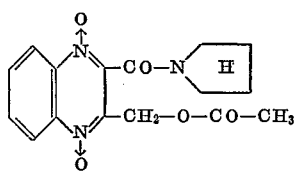

14. The compounnd:

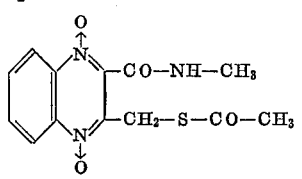

15. The compound:

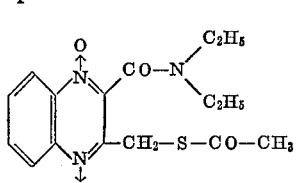

16. The compound:

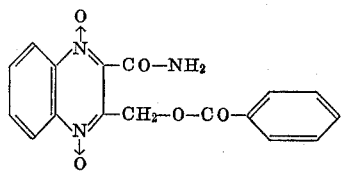

17. The compound:

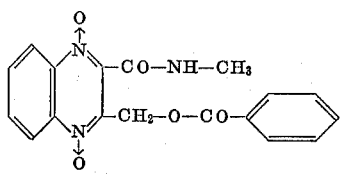

18. The compound:

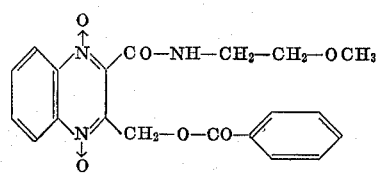

19. The compound:

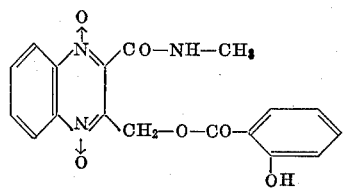

20. A process for the production of a compound of claim 1 which comprises suspending or dissolving in an organic solvent a 2-halomethyl-3-carboxylic acid amido-quinoxaline-1,4-di-N-oxide of the formula:

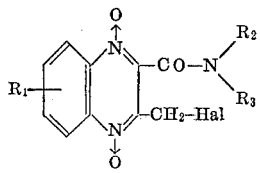

and adding a concentrated aqueous solution of a salt of a monocarboxylic acid of the formula:

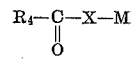

in which formula $R_1$, $R_2$, $R_3$, $R_4$ and X have the same meaning as in claim 1 in the presence of an organic solvent at a temperature of 40–160° C.

21. A process according to claim 20 in which the reaction is carried out at 60–100° C.

22. A process of claim 20 in which there is one molar equivalent of the 2-halomethyl-3-carboxylic acid-amido-quinoxaline-1,4-di-N-oxide to one to two molar equivalents of the mono-carboxylic acid salt.

References Cited

UNITED STATES PATENTS 3,157,654 11/1964 Sasse et al. _____ 260—250
3,398,141 8/1968 Haddadin et al. _____ 260—250

NICHOLAS S. RIZZO, Primary Examiner

U.S. Cl. X.R.

424—250

PO-1050
(5/69)

UNITED STATES PATENT OFFICE
CERTIFICATE OF CORRECTION

Patent No. 3,558,624          Dated January 26, 1971

Inventor(s) Kurt Ley, Ulrich Eholzer, Roland Nast, Karl Georg Metzger, Dieter Fritsche It is certified that error appears in the above-identified patent and that said Letters Patent are hereby corrected as shown below:

Column 1, line 12, "F 53,366" should read -- F 53,666 --

Signed and sealed this 18th day of May 1971.

(SEAL)
Attest:

EDWARD M. FLETCHER, JR.
Attesting Officer

WILLIAM E. SCHUYLER, JR.
Commissioner of Patents